United States Patent
Carlough et al.

(10) Patent No.: US 10,198,302 B2
(45) Date of Patent: Feb. 5, 2019

(54) RESIDUE PREDICTION OF PACKED DATA

(71) Applicant: International Business Machines Corporation, Armonk, NY (US)

(72) Inventors: Steven R. Carlough, Poughkeepsie, NY (US); Petra Leber, Ehningen (DE); Daniel Lipetz, Linden, NJ (US); Silvia M. Mueller, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/857,864

(22) Filed: Dec. 29, 2017

(65) Prior Publication Data

US 2018/0276548 A1 Sep. 27, 2018

Related U.S. Application Data

(63) Continuation of application No. 15/464,396, filed on Mar. 21, 2017.

(51) Int. Cl.
| G06F 11/07 | (2006.01) |
| G06F 7/483 | (2006.01) |
| G06N 5/04 | (2006.01) |

(52) U.S. Cl.
CPC .......... *G06F 11/0721* (2013.01); *G06F 7/483* (2013.01); *G06F 11/0763* (2013.01); *G06N 5/04* (2013.01)

(58) Field of Classification Search
CPC .............................. G06F 11/0721; G06F 7/483
See application file for complete search history.

(56) References Cited

U.S. PATENT DOCUMENTS

| 7,555,692 | B1 | 6/2009 | Iacobovici |
| 7,769,795 | B1 | 8/2010 | Iacobovici |
| 8,286,061 | B2 | 10/2012 | Carlough et al. |
| 9,110,768 | B2 | 8/2015 | Iacobovici |
| 2008/0270506 | A1 | 10/2008 | Lundvall et al. |
| 2014/0046994 | A1* | 2/2014 | Kamoshida ............ G06F 7/483 708/505 |
| 2014/0188965 | A1 | 7/2014 | Iacobovici |

FOREIGN PATENT DOCUMENTS

| JP | 2016042651 A | 3/2016 |

OTHER PUBLICATIONS

Elsayed et al.; "Error Correction in Floating Point Units Using Information Redundancy"; Faculty of Engineering, Cairo University Giza, Egypt; © 2012; 96 pages.

"IEEE Standard for Floating-Point Arithmetic"; IEEE Computer Society; Aug. 29, 2008; 70 pages.

(Continued)

*Primary Examiner* — Joseph D Torres
(74) *Attorney, Agent, or Firm* — Edward J. Wixted, III

(57) ABSTRACT

In an approach for protecting recoding logic in a computing environment, a processor obtains an operand of an instruction in a first data format. A processor converts the operand from the first data format to a second data format. A processor generates a predicted residue of the operand in the second data format, wherein generating the predicted residue of the operand in the second data format comprises: generating a residue of the operand from the first data format.

1 Claim, 5 Drawing Sheets

(56) References Cited

OTHER PUBLICATIONS

Carlough et al., "Residue Prediction of Packed Data", U.S. Appl. No. 15/464,396, filed Mar. 21, 2017, 29 pages.
Carlough et al., "Residue Prediction of Packed Data", U.S. Appl. No. 15/842,943, filed Dec. 15, 2017.
IBM, "List of Patent Applications Treated As Related", Appendix P, Dated Dec. 29, 2017, 2 pages.

* cited by examiner

RESIDUE PREDICTION OF PACKED DATA

BACKGROUND

The present invention relates generally to the field of error detection, and more particularly to protecting the recoding logic.

Error detection and correction or error control are techniques that enable reliable delivery of digital data over unreliable channels of computed results in machine hardware. Errors in computing systems can be caused by electromagnetic noise from the surrounding environment; cosmic radiation, causing latches or memory to change state; deterioration of transistors or wires during the lifetime of the machine; beta particle emission from solder; thermal noise; and numerous other factors. For a machine executing mission-critical transactions, such as financial transactions, these errors must be detected so they do not result in an erroneous result.

SUMMARY

Aspects of an embodiment of the present invention disclose a method, computer program product, and computing system for protecting recoding logic in a computing environment. A processor obtains an operand of an instruction in a first data format. A processor converts the operand from the first data format to a second data format. A processor generates a predicted residue of the operand in the second data format, wherein generating the predicted residue of the operand in the second data format comprises: generating a residue of the operand from the first data format.

DETAILED DESCRIPTION

Embodiments of the present invention recognize that with the current state of error detection, one of the challenges is to protect the recoding logic. Embodiments of the present invention recognize the need to correct faults during production, end-of-life, and particles hitting devices. Additionally, embodiments of the present invention recognize the importance of cost efficient error detection. Embodiments of the present invention detail an approach that can be used to protect the recoding logic.

Embodiments of the present invention will now be described in detail with reference to the Figures.

Figure 1:
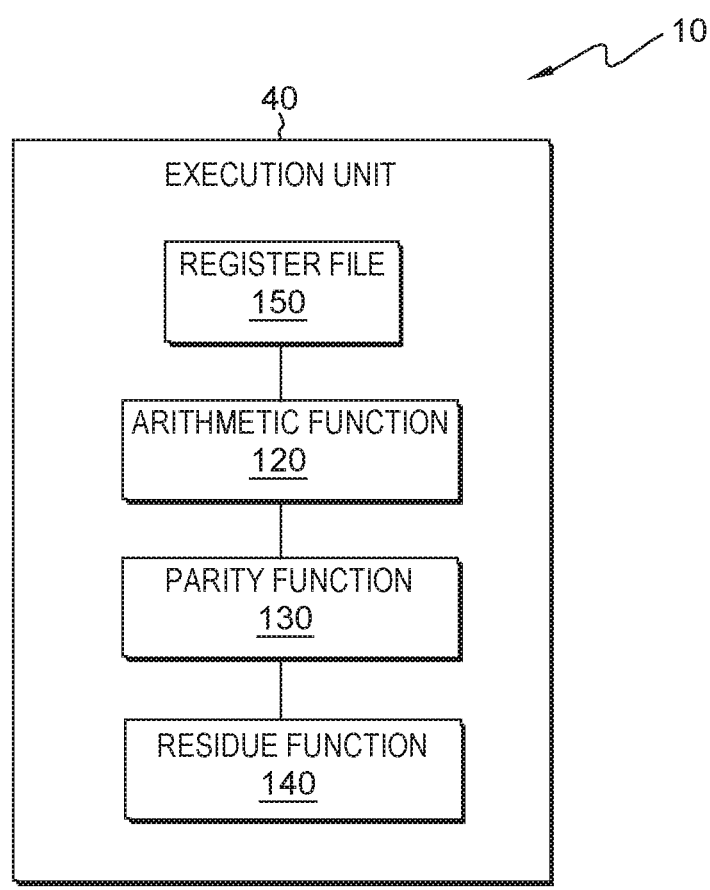
FIG. 1 depicts a block diagram of a processor, in accordance with an embodiment of the present invention.

FIG. 1 depicts a block diagram of processor 10, in accordance with one embodiment of the present invention. FIG. 1 provides an illustration of one embodiment and does not imply any limitations with regard to the environments in which different embodiments may be implemented.

In the depicted embodiment, processor 10 includes execution unit 40. Processor 10 may include additional execution units or other components not shown.

Execution unit 40 may be any execution unit that is a part of a central processing unit that performs the operations and calculations as instructed by a computer program. In one embodiment, execution unit 40 may be an arithmetic logic unit. In other embodiments, execution unit 40 may be a floating-point unit. In the depicted embodiment, execution unit 40 contains arithmetic function 120, parity function 130, residue function 140, and register file 150. In other embodiments, execution unit 40 may include other components.

Execution unit 40 protects the recoding logic. In doing so, execution unit 40 performs arithmetic on the operands. Execution unit 40 protects the input/output. Execution unit 40 protects the arithmetic. In the depicted embodiment, execution unit 40 resides on processor 10. In other embodiments, execution unit 40 may reside on another processor, provided that execution unit 40 can access arithmetic function 120, parity function 130, residue function 140, and register file 150.

Arithmetic function 120 performs arithmetic on the operands. In doing so, arithmetic function 120 receives operands in a first format. Arithmetic function 120 converts, or unpacks, operands to a second format. Arithmetic function 120 performs arithmetic on the operands in the second format. Arithmetic function 120 converts (i.e., packs or recodes) the result to the first format.

Parity function 130 protects the input/output. In doing so, parity function 130 receives operands and parity in a first format. Parity function 130 generates parity of operands. Parity function 130 receives a result in a second format and the first format. Parity function 130 predicts parity of the result in the first format. Parity function 130 generates parity of the result in the first format. Parity function 130 determines whether the predicted parity and the generated parity are equal.

In some embodiments, error-correcting code (ECC) protects the input/output. ECC is a method of data storage that can detect and correct internal data corruption. ECC is used in computers where data corruption cannot be tolerated under any circumstances, such as for financial computing.

Residue function 140 protects the arithmetic. In some embodiments, residue function 140 protects the unpacking logic, as well as the actual arithmetical function. In doing so, residue function 140 receives operands in a first format. Residue function 140 predicts residue of operands in a second format. Residue function 140 predicts residue of a result. Residue function 140 generates residue of the result. Residue function 140 determines whether the predicted residue and the generated residue are equal.

Register file 150 may be a repository that may be written to and/or read by execution unit 40. In some embodiments, execution unit 40 may allow a user to define sets of data to be used as operands within the system and store the sets of data to register file 150. In other embodiments, register file 150 may store status information and additional information, which relates to the result of the current or previous operations. There may be multiple register files 150.

Figure 2:
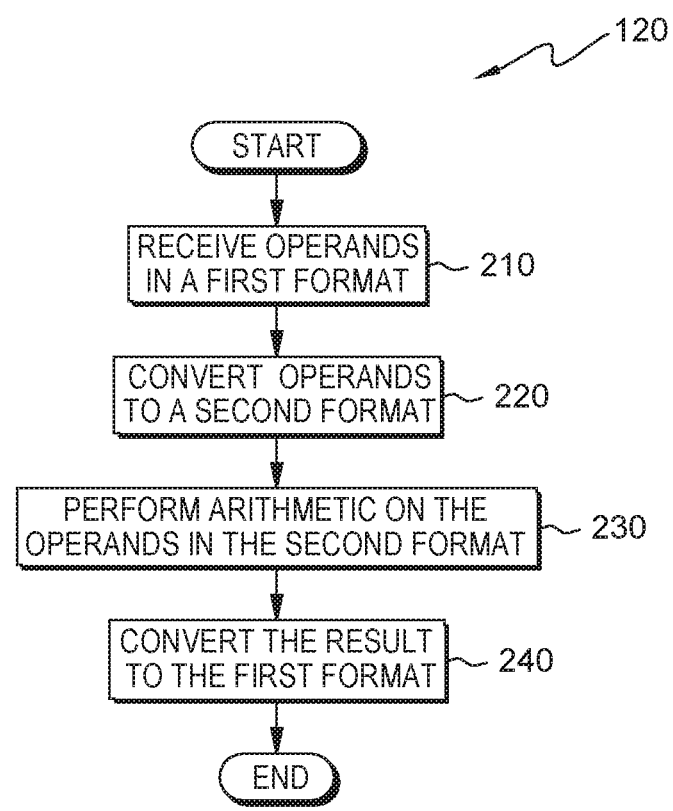
FIG. 2 depicts a flowchart of the steps of an arithmetic function, executing within the processor of FIG. 1, for performing arithmetic on operands, in accordance with an embodiment of the present invention.

FIG. 2 depicts a flowchart of the steps of an arithmetic function, executing within the processor of FIG. 1, in accordance with an embodiment of the present invention. Arithmetic function 120 performs arithmetic on operands.

In step 210, arithmetic function 120 receives operands in a first format. In one embodiment, arithmetic function 120 receives formatted decimal data in the first format, the formatted decimal data including densely packed decimal (DPD) format data. In such an embodiment, there is a plurality of ten bit groups of DPD data, each containing 3 decimal digits. In other embodiments, arithmetic function 120 receives formatted decimal data in the first format, the formatted decimal data including binary coded decimal (BCD) format data. In some embodiments, arithmetic function 120 receives formatted decimal data in the first format, the formatted decimal data including decimal interchange code (EBCDIC)/zoned format data. In some embodiments, arithmetic function 120 receives single precision or double precision or extended precision formatted binary floating point data in the first format. In one embodiment, arithmetic function 120 receives the operands in the first format from register file 150. In some embodiments, arithmetic function 120 stores the operands in the first format to register file 150.

Herein, for simplification, the present application assumes DPD to BCD expansion and BCD to DPD compression. The present application also assumes that the first format is DPD format data and the second format is BCD format data.

In step 220, arithmetic function 120 converts operands to a second format. In one embodiment, arithmetic function 120 converts the operands to the second format, using a DPD to BCD converter to convert and expand every ten bits of DPD data to twelve bits of BCD data. In some embodiments, arithmetic function 120 stores the BCD data to register file 150.

In step 230, arithmetic function 120 performs arithmetic on the operands in the second format. In one embodiment, arithmetic function 120 performs arithmetic on the converted operands using an arithmetical engine. Examples of arithmetical engines include, but are not limited to: decimal floating point unit, binary floating point unit configured to receive operands with different precisions (e.g., single precision, double precision, and extended precision), and decimal integer. In some embodiments, arithmetic function 120 obtains a result in the second format after the arithmetic is complete. In some embodiments, arithmetic function 120 stores the result in the second format to register file 150.

In step 240, arithmetic function 120 converts the result to the first format. In one embodiment, arithmetic function 120 converts the result back to the first format, using a BCD to DPD converter to convert and compress every twelve bits of BCD data to ten bits of DPD data. In some embodiments, the DPD data is stored to register file 150.

Figure 3:
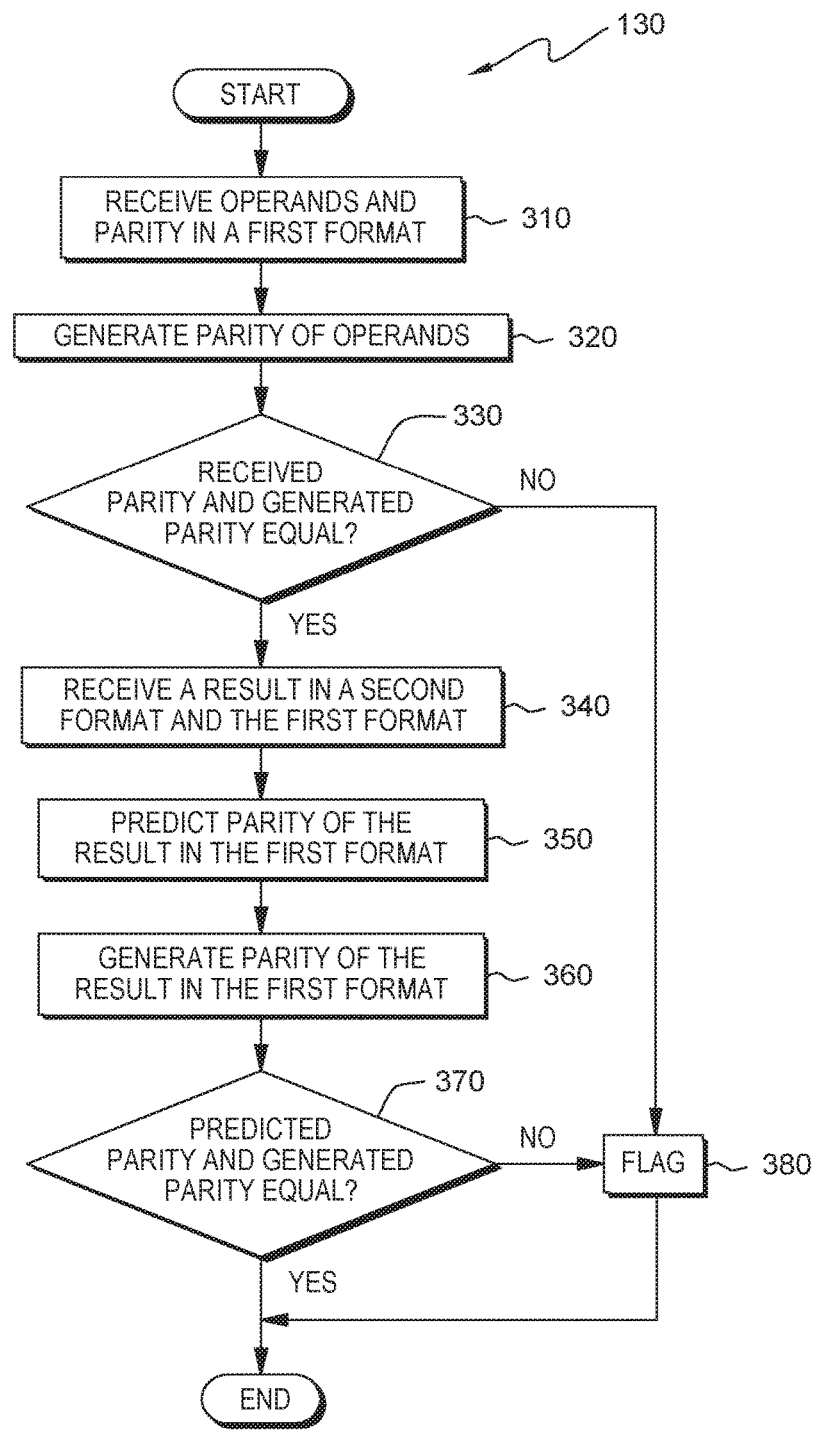
FIG. 3 depicts a flowchart of the steps of a parity function, executing within the processor of FIG. 1, for protecting the input/output, in accordance with an embodiment of the present invention.

FIG. 3 depicts a flowchart of the steps of a parity function, executing within the processor of FIG. 1, in accordance with an embodiment of the present invention. Parity function 130 protects the input/output.

In step 310, parity function 130 receives operands and parity in a first format. In one embodiment, parity function 130 runs simultaneously with arithmetic function 120. In such an embodiment, parity function 130 can receive the same operands at the same time as arithmetic function 120. In other embodiments, parity function 130 does not run simultaneously with arithmetic function 120. In such embodiments, parity function 130 may receive operands from arithmetic function 120, from register file 150 that were previously stored by arithmetic function 120, and/or from a conversion requester. Additionally, in one embodiment, parity function 130 receives a parity bit from a conversion requester. In other embodiments, parity function 130 receives a parity bit from register file 150.

In step 320, parity function 130 generates parity of operands. In one embodiment, parity function 130 generates parity of the operands by inputting the received DPD data and the received DPD parity bit to a parity generator. The parity generator calculates the parity of the operands.

In decision 330, parity function 130 determines whether the received DPD parity bit and the generated parity of the operands are equal. Parity function 130 makes this determination by comparing the received DPD parity bit and the generated parity of the operands. In one embodiment, the output of the comparison is stored to register file 150. If parity function 130 determines the received DPD parity bit and the generated parity of the operands are not equal (decision 330, no branch), parity function 130 flags the system (step 380). If parity function 130 determines the received DPD parity bit and the generated parity of the operands are equal (decision 330, yes branch), parity function 130 receives a result in a second format and the first format (step 340). The comparison and the flag allow error detection on the input DPD data to verify that the DPD data was transmitted with or without error.

In step 340, parity function 130 receives a result in a second format and the first format. In one embodiment, parity function 130 receives the result in the second format and the first format from arithmetic function 120. In other embodiments, parity function 130 receives the result in the second format and the first format from register file 150. The result in the second format is the result obtained after the arithmetic is performed in arithmetic function 120. The result in the first format is the result obtained after the arithmetic is performed in arithmetic function 120 and after converting that result back to the first format.

In step 350, parity function 130 predicts parity of the result in the first format. In one embodiment, parity function 130 predicts the parity of the result in the first format by generating parity of the result in the second format by inputting the received result in the second format into a parity generator. In some embodiments, parity function 130 stores the generated parity of the result in the second format to register file 150.

In step 360, parity function 130 generates parity of the result in the first format. In one embodiment, parity function 130 generates parity of the result in the first format by inputting the received result in the first format into a parity generator. In some embodiments, parity function 130 stores the generated parity of the result in the first format to register file 150.

In decision 370, parity function 130 determines whether the predicted parity and the generated parity are equal. Parity function 130 makes this determination by comparing the predicted parity and the generated parity. In one embodiment, the output of the comparison is stored to register file 150. If parity function 130 determines the predicted parity and the generated parity are equal (decision 370, yes branch), parity function 130 ends. If parity function 130 determines the predicted parity and the generated parity are not equal (decision 370, no branch), parity function 130 flags the system (step 380).

In step 380, parity function 130 flags the system. In one embodiment, parity function 130 outputs an error flag (e.g., an error bit is set to one to indicate an error and reset to zero to indicate no error).

Figure 4:
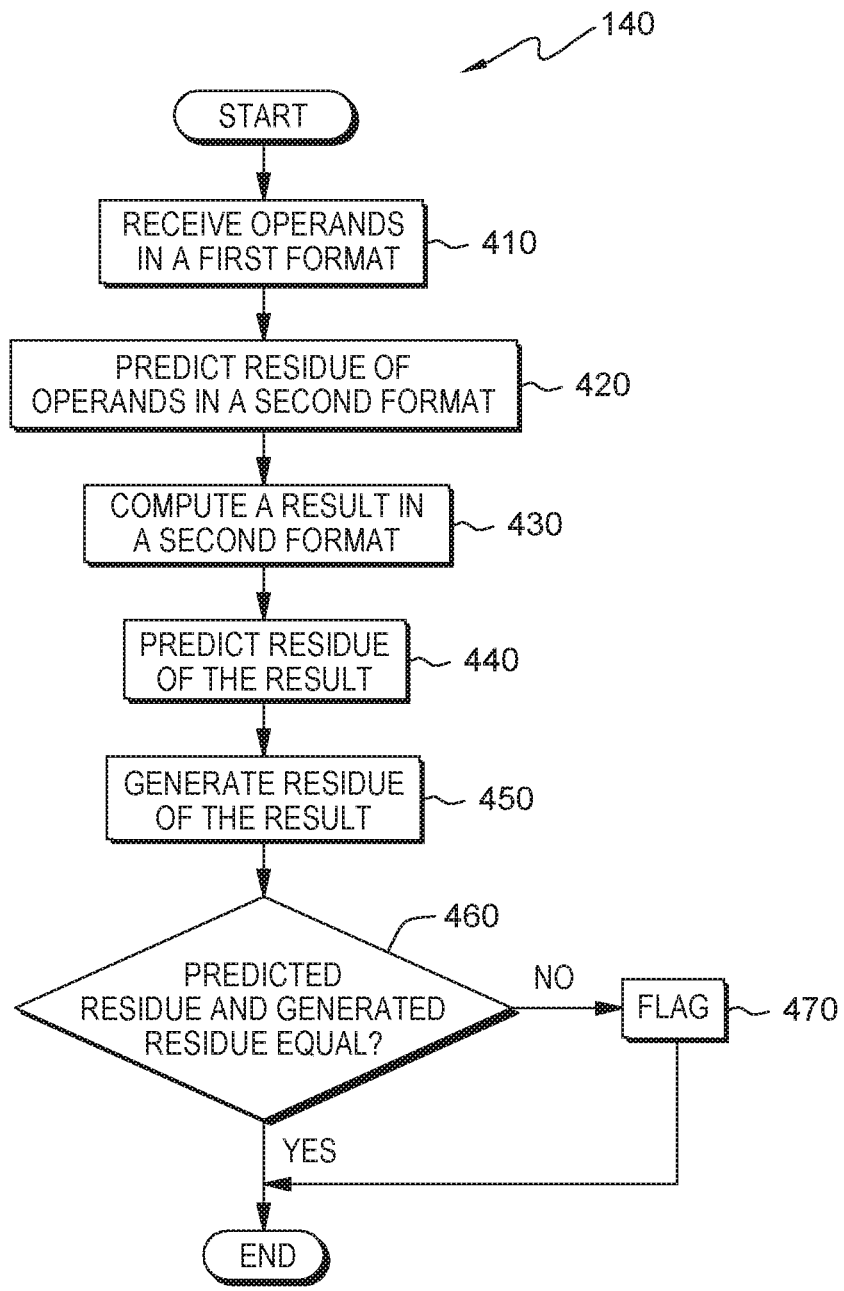
FIG. 4 depicts a flowchart of the steps of a residue function, executing within the processor of FIG. 1, for protecting the arithmetic, in accordance with an embodiment of the present invention.

FIG. 4 depicts a flowchart of the steps of a residue function, executing within the processor of FIG. 1, in accordance with an embodiment of the present invention. Residue function 140 protects the arithmetic.

In step, 410, residue function 140 receives operands in a first format. In one embodiment, residue function 140 runs simultaneously with arithmetic function 120. In such an embodiment, residue function 140 can receive the same operands at the same time as arithmetic function 120. In other embodiments, residue function 140 does not run simultaneously with arithmetic function 120. In such embodiments, residue function 140 may receive operands from arithmetic function 120, from register file 150 that were previously stored by arithmetic function 120, and/or from a conversion requester.

In step 420, residue function 140 predicts residue of operands in a second format. In one embodiment, residue function 140 predicts the residue of the operands in the second format by generating predicted residue of the operands in the first format by inputting the received operands in the first format into a residue predictor. In some embodiments, residue function 140 stores the predicted residue of the operands in the first format to register file 150. In some embodiments, residue function 140 receives operands in densely packed decimal format. In such an embodiment, for each declet, predicted residue is created with logic that is configured to generate residue of three of its three-bit groups, coding digits with values of 0-7; to generate residue for the one-bit elements, coding digits with values of 8 and 9; to select between the two types of residue; and to combine the digit residues to the residue of the mantissa, using a residue adder tree. The following table depicts how the residue of the digits in a DPD declet is computed, in accordance with an embodiment of the present invention:

| 10-Bit DPD Declet | | | | BCD Digits | | | | residue |
|---|---|---|---|---|---|---|---|---|
| g, h, j | k, l, m | n | p, q, s | digit 0 | digit 1 | digit 2 | klnpq | value |
| DD d | EE e | 0 | FF f | 0DDd | 0EEe | 0FFf | 0 | r(ghj) + r(klm) + r(pqs) |
| DD d | EE e | 1 | 00 f | 0DDd | 0EEe | 100f | **100 | r(8) + r(ghj) + |
| DD d | FF e | 1 | 01 f | 0DDd | 100e | 0FFf | **101 | r(ghj) + |
| FF d | EE e | 1 | 10 f | 100d | 0EEe | 0FFf | **110 | r(klm) + s |
| DD d | 10 e | 1 | 11 f | 0DDd | 100e | 100f | 10111 | r(16) + |
| EE d | 01 e | 1 | 11 f | 100d | 0EEe | 100f | 01111 | r(ghj) + m + s |
| FF d | 00 e | 1 | 11 f | 100d | 100e | 0FFf | 00111 | |
| xx d | 11 e | 1 | 11 f | 100d | 100e | 100f | 11111 | r(24) + j + m + s |

In step 430, residue function 140 computes a result in a second format. In one embodiment, residue function 140 receives the result in the second format from arithmetic function 120. In other embodiments, residue function 140 receives the result in the second format from register file 150. The result in the second format is the result obtained after the arithmetic is performed in arithmetic function 120.

In step 440, residue function 140 predicts residue of the result. In one embodiment, using the predicted residue of the operands in the second format, residue function 140 predicts the residue of the result by modeling the arithmetical function for computation used in arithmetic function 120 in the residue logic. In some embodiments, residue function 140 stores the predicted residue of the result to register file 150.

In step 450, residue function 140 generates residue of the result. In one embodiment, residue function 140 generates the residue of the result in the second format by inputting the received result in the second format into a residue generator.

In some embodiments, residue function 140 stores the generated residue of the result in the second format to register file 150.

In decision 460, residue function 140 determines whether the predicted residue and the generated residue are equal. Residue function 140 makes this determination by comparing the predicted residue and the generated residue. In one embodiment, the output of the comparison is stored to register file 150. If residue function 140 determines the predicted residue and the generated residue are equal (decision 460, yes branch), residue function 140 ends. If residue function 140 determines the predicted residue and the generated residue are not equal (decision 460, no branch), residue function 140 flags the system (step 470).

In step 470, residue function 140 flags the system. In one embodiment, residue function 140 outputs an error flag (e.g., an error bit is set to one to indicate an error and reset to zero to indicate no error).

Figure 5:
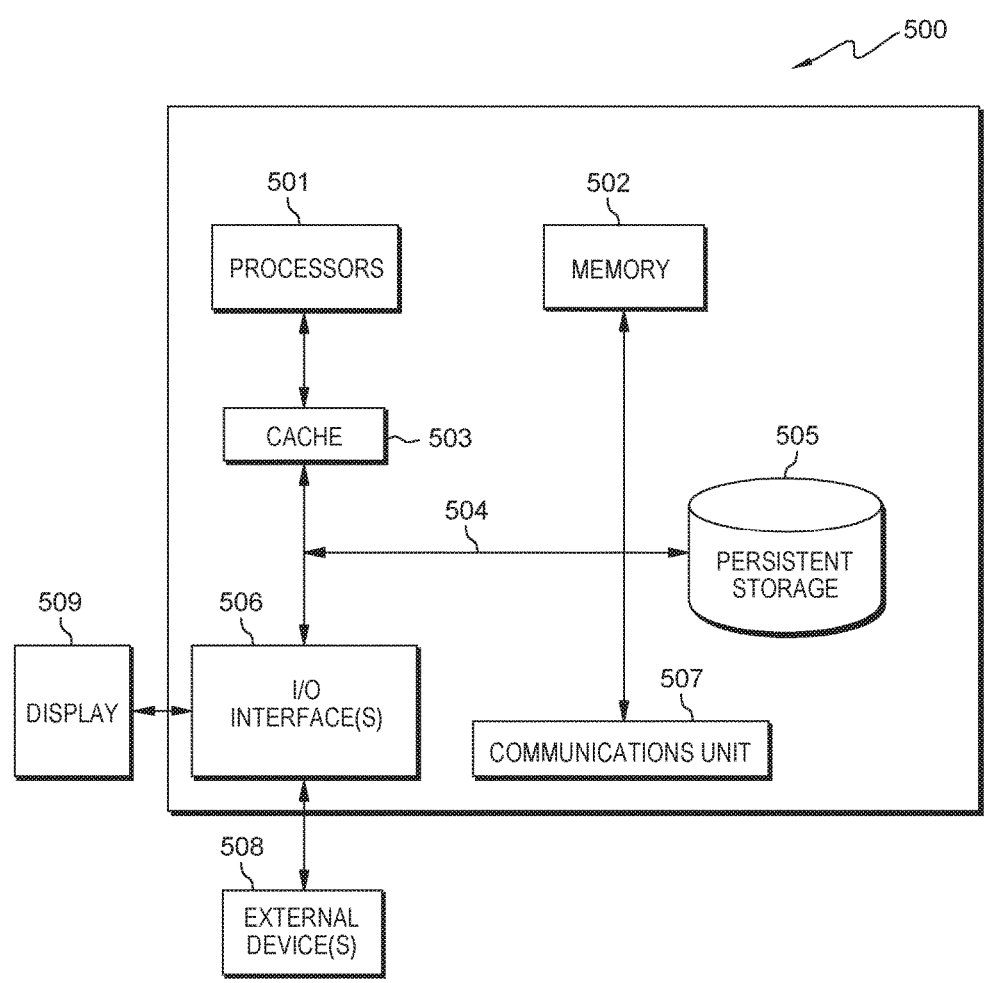
FIG. 5 depicts a block diagram of components of the processor of FIG. 1, in accordance with an embodiment of the present invention.

FIG. 5 depicts computer system 500, which is an example of a system that includes execution unit 40. Computer system 500 includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507. Arithmetic function 120, parity function 130, and residue function 140 may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., arithmetic function 120, parity function 130, and residue function 140, can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for protecting recoding logic in a computing environment, executed by at least one processor, the method comprising:
    obtaining an operand of an instruction in a first data format from a computing environment with an input and an output, wherein a decimal floating point unit receives the operand in the first data format and the first data format is a densely packed decimal (DPD) format, including three decimal digits encoded in a 10-bit DPD declet, wherein for the 10-bit DPD declet, logic is configured to generate a residue of the three decimal digits encoded in the 10-bit DPD declet, and
    wherein the operand in the first data format is received in an EBCDIC and zoned data format and the arithmetic is performed in a binary coded decimal data format;
converting the operand from the first data format to a second data format using a DPD to BCD converter;
generating a predicted residue of the operand in the second data format, wherein generating the predicted residue of the operand in the second data format comprises: generating a residue of the operand from the first data format;
performing arithmetic on the operand in the second data format, using an arithmetic function, wherein the arithmetic function includes the decimal floating point unit, a binary floating point unit configured to receive operands with single precision, double precision, and extended precision, and a decimal integer;
generating an actual residue of a result obtained from the performed arithmetic on the operand in the second data format;
generating a predicted residue of the result, wherein generating the predicted residue of the result comprises: applying the predicted operand residue to a model arithmetical function in residue logic, protecting the arithmetic function;
comparing the predicted residue of the result and the actual residue of the result;
determining that the predicted residue of the result and the actual residue of the result do not match;
generating an error flag, based on the determination that the predicted residue of the result and the actual residue of the result do not match;
receiving a parity bit;
generating a parity of the operand, using the received parity bit, by inputting the operand and the parity bit to a parity generator, wherein the parity generator calculates a parity of the operand;
predicting a parity of a result in the first format, wherein predicting the parity of the result in the first format comprises: generating a parity of the result in the second format;
generating a parity of the result in the first format, wherein error correcting code protects the input and the output in the computing environment, wherein the error correcting code is a method of data storage that can detect and correct internal data corruption for a zero-tolerance data corruption computing environment; and
comparing the predicted parity of the result in the first format and the generated parity of the result in the first format.

* * * * *